(12) United States Patent
Mock et al.

(10) Patent No.: US 8,249,646 B2
(45) Date of Patent: *Aug. 21, 2012

(54) AUTOMATED COMMUNICATION USING IMAGE CAPTURE

(75) Inventors: Von A. Mock, Boynton Beach, FL (US); Daniel A. Baudino, Lake Worth, FL (US); Jorge L. Perdomo, Boca Raton, FL (US); Amy M. Tupler, Hollywood, FL (US)

(73) Assignee: Motorola Mobility LLC, Libertyville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/036,793

(22) Filed: Feb. 28, 2011

(65) Prior Publication Data

US 2011/0151904 A1  Jun. 23, 2011

Related U.S. Application Data

(63) Continuation of application No. 11/537,118, filed on Sep. 29, 2006, now Pat. No. 7,925,293.

(51) Int. Cl.
*H04M 1/00* (2006.01)
(52) U.S. Cl. .................................. 455/550.1; 455/566
(58) Field of Classification Search ............... 455/550.1, 455/566
See application file for complete search history.

(56) References Cited

U.S. PATENT DOCUMENTS

| | | | |
|---|---|---|---|
| 6,941,001 | B1 | 9/2005 | Bolle et al. |
| 7,221,811 | B2 | 5/2007 | Debrito |
| 7,418,120 | B2 | 8/2008 | Weiner et al. |
| 7,424,282 | B2 | 9/2008 | Barbeau |
| 2002/0057851 | A1 | 5/2002 | Ohdate et al. |
| 2004/0005915 | A1 | 1/2004 | Hunter |
| 2004/0029526 | A1 | 2/2004 | Miki et al. |
| 2004/0240434 | A1 | 12/2004 | Sato et al. |
| 2005/0091272 | A1 | 4/2005 | Smith et al. |
| 2005/0193117 | A1 | 9/2005 | Morris |
| 2005/0248776 | A1 | 11/2005 | Ogino |
| 2006/0003761 | A1 | 1/2006 | Fry et al. |
| 2006/0013440 | A1 | 1/2006 | Cohen et al. |

(Continued)

OTHER PUBLICATIONS

New Technologies in Social Computing, Microsoft Research, http://traindrop.msresearch.us/wiki/default.aspx/SCG. New Technologies, 1 pg., Accessed Sep. 14, 2006.

(Continued)

*Primary Examiner* — Ajit Patel
(74) *Attorney, Agent, or Firm* — Stephen H. Shaw

(57) ABSTRACT

A server includes a communications adapter; a controller and a datastore. The controller receives a first user input via a user interface to associate at least one image attribute with a contact. Thereby, responsive to receiving an image from an electronic apparatus, the controller automatically processes the image to identify at least one feature of the image that corresponds to the image attribute, and associates the image with the contact based on the image attribute; and communicates the image to the contact via the communications adapter. The datastore is suitable for storing digital information, and is communicatively coupled to the controller.

7 Claims, 3 Drawing Sheets

U.S. PATENT DOCUMENTS

| | | | |
|---|---|---|---|
| 2006/0077495 A1* | 4/2006 | Nakamura | 358/540 |
| 2006/0120568 A1 | 6/2006 | McConville et al. | |
| 2006/0123086 A1 | 6/2006 | Morris | |
| 2006/0172729 A1 | 8/2006 | Kirbas | |
| 2006/0206475 A1 | 9/2006 | Naam et al. | |
| 2006/0229063 A1 | 10/2006 | Koch | |
| 2007/0043748 A1 | 2/2007 | Bhalotia et al. | |
| 2007/0139529 A1 | 6/2007 | Levien et al. | |
| 2007/0195174 A1 | 8/2007 | Oren | |
| 2008/0014906 A1 | 1/2008 | Tysowski et al. | |
| 2008/0200174 A1 | 8/2008 | Fry et al. | |
| 2009/0174768 A1* | 7/2009 | Blackburn et al. | 348/130 |
| 2009/0196510 A1 | 8/2009 | Gokturk et al. | |
| 2009/0325570 A1 | 12/2009 | Rensin et al. | |

OTHER PUBLICATIONS

Smith, et al.: Multimedia Analysis and Retrieval Engine—An automated desktop indexing and search system for digital images, IBM Alphaworks, http://www.alphaworks.ibm.com/tech/marvel, Jan. 28, 2005, 2 pages.

Olsen, Search Technology comes to the camera phone, Cnet news.com, http://news.com.com/Search=technology+comes+to+the+camera+phone/2100-1038_3-5967710.html, Nov. 22, 2005, 3 pages.

Social Computing Group, Microsoft Research, http://research.microsoft.com/scg/, Social Computing Symposium 2005, 7 pages.

* cited by examiner

| Contact or Group | Name of Associated Attribute | | Message |
|---|---|---|---|
| Jane | Rose | ▽ | I'm Thinking of You |
| Fred | Motorcycle | ▽ | Nice Ride |
| Jim | Beach | ▽ | Wish you were here |
| Bowling Team | Scoreboard | ▽ | Check out this score! |
| Relatives | Baseball Game | ▽ | Little Johnny's Team is Winning! |

AUTOMATED COMMUNICATION USING IMAGE CAPTURE

RELATED APPLICATIONS

This a continuation of application Ser. No. 11/537,118 filed Sep. 29, 2006, and titled "AUTOMATED COMMUNICATION USING IMAGE CAPTURE". These applications are commonly owned by Motorola Mobility, Inc., and priority is taken therefrom the earlier filed application. The entire contents of the earlier filed application are incorporated herein by reference.

CHANGE IN POWER OF ATTORNEY

The power of attorney has changed from the parent application Ser. No. 11/537,118. On Feb. 9, 2011 the USPTO accepted power of attorney for Customer No.: 20280, MOTOROLA MOBILITY, INC. and revoked the previous power of attorney for Customer No.: 44984, CUENOT, FORSYTHE & KIM.

FIELD OF THE INVENTION

The present invention generally relates to mobile communication devices and, more particularly, to such devices that include image capture features.

BACKGROUND OF THE INVENTION

Mobile stations have become a part of modern life in most parts of the world. People now can conveniently communicate from virtually anywhere within an industrialized country, and while performing any of a number of activities. For instance, mobile station users can communicate while strolling through a park, exercising at the gym or commuting to work.

Notwithstanding the convenience mobile stations provide, they also can be a source of irritation to some users, such as those who receive a call at an inopportune time or who are not able to break free from a lengthy conversation. Accordingly, there continues to be a need for mobile station features that improve the user experience.

SUMMARY OF THE INVENTION

A server includes a communications adapter; a controller and a datastore. The controller receives a first user input via a user interface to associate at least one image attribute with a contact. Thereby, responsive to receiving an image from an electronic apparatus, the controller automatically processes the image to identify at least one feature of the image that corresponds to the image attribute, and associates the image with the contact based on the image attribute; and communicates the image to the contact via the communications adapter. The datastore is suitable for storing digital information, and is communicatively coupled to the controller.

BRIEF DESCRIPTION OF THE DRAWINGS

Preferred embodiments of the present invention will be described below in more detail, with reference to the accompanying drawings, in which.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The present invention relates to a method and a system for quickly and efficiently communicating messages to one or more contacts. In particular, a user of a communication device can associate image attributes with the contacts. Further, messages also can be associated with the contacts and/or with the image attributes. When the communication device receives an image containing a feature that correlates to a known image attribute, the image and corresponding message can be automatically sent to the contact(s) with whom the image attribute is associated. For example, the user can associate image attributes corresponding to flowers with a contact, and can associate the message "thinking of you" with the image attributes. In response to the communication device capturing an image of a flower that has features that correlate to the image attributes, the communication device can automatically associate the message with the captured image and communicate the captured image and message to the contact. In this manner, a meaningful multimedia message can be communicated to a contact merely by the act of taking a picture.

Figure 1:
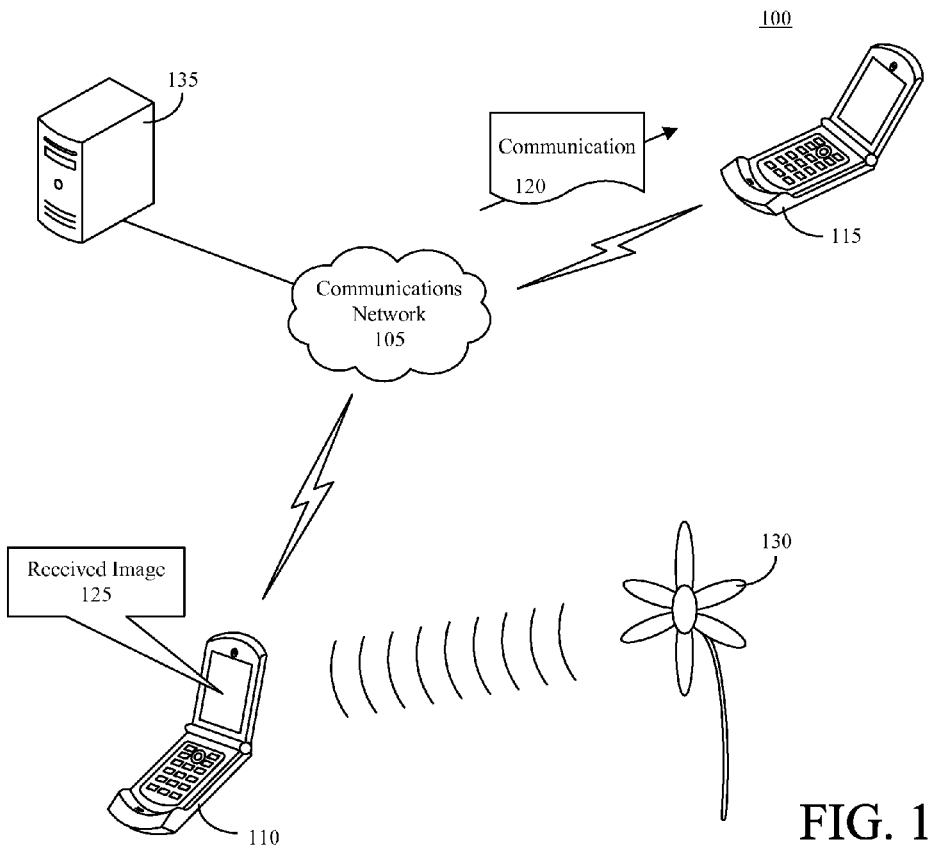
FIG. 1 depicts a communications system that is useful for understanding the present invention.

FIG. 1 depicts a communications system 100 that is useful for understanding the present invention. The communications system 100 can include a communications network 105, which can comprise, for example, the Internet, the World Wide Web, a wide area network (WAN), a local area network (LAN), a cellular communications network, a dispatch communications network, an interconnect communications network, a public switched telephone network (PSTN), and/or any other networks or systems over which communication signals can be propagated. In that regard, the communications network can include wired and/or wireless communication links.

The communications system 100 also can include a communication device 110 and a communication device 115. The communication device 110 can be a mobile station, such as a mobile computer, a personal digital assistant (PDA) or a mobile telephone, a camera that includes communications functionality, or any other electronic apparatus that may be used to send a communication 120 containing an image 125 via the communications network 105. The communication

120 can be propagated via wireless and/or wireless communication links. Similarly, the communication device 115 can be a mobile station, a computer, a set top box, an image display device, or any other electronic apparatus that may be used to receive the communication 120. The communication device 115 can be communicatively linked to the communications network 105 and can receive the communication 120 via wired and/or wireless communication links.

In operation, the communication device 110 can receive the image 125. For example, in response to a user input, the communication device 110 can capture an image of an object 130, such as a flower. The communication device 110 then can process the received image 125 to identify features which may correlate to image attributes associated with one or more contacts.

The communication device 110 also can identify one or more messages associated with the image attributes and/or the contacts. Such messages can comprise text, audio, still images and/or video. In one arrangement, the audio that is provided in the message can be pre-recorded. For instance, if the received image 125 contains features associated with a motorcycle, the audio can include the sound of a motorcycle. In another arrangement, the audio can be recorded when the image 125 is received. For example, before, during or after capturing an image with the communication device, the communication device 110 can prompt the user to provide an audio input, such as a spoken utterance. An ambient sound detected by the communication device also can be recorded.

The communication device 110 then can send the communication 120, which may include the image 125 and a corresponding message, to the contact. For instance, the communication device 110 can forward the communication 120 to the communication device 115, which may be associated with the contact, and/or to other communication devices associated with other contacts with whom correlating image attributes are associated. The communication 120 can be initiated in response to a user input, automatically initiated in response to the image being received by the communication device 110 while the communication device 110 is in a particular image communication mode, or initiated in any other suitable manner.

In another arrangement, in response to receiving the image 125, the communication device 110 can automatically communicate the image 125 to a server 135, and the server 135 can process the image to identify image features which may correlate to the image attributes associated with the contact(s). The server 135 also can identify the messages associated with the image attributes and/or the contact(s). The server then can forward the image 125 and the corresponding message(s) to the contact(s) in the communication 120. The server 135 can be a network server, a web server, a mobile switching center (MSC), a basestation controller (BSC), or any other device suitable for implementing the server processes described herein.

Image processing profiles can be established on the communication device 110 and/or the server 135. In one arrangement, one or more messages can be associated with image attributes and/or contacts which prompt the contacts to provide feedback after receiving the image 125. For example, a shopping profile can be established. This profile can associate image attributes correlating to images of clothing with a plurality of contacts. The associated message can, for instance, prompt contacts who are friends of the user to provide their opinions of the clothing. Opinions submitted by the contacts can be received as textual responses, as icons which indicate approval, disapproval or indifference, as still images or video, or in any other suitable manner. A second message can ask a parent of the user for his/her approval for purchase of the clothing. Again, such response can be received in any suitable manner. In one arrangement, the communication 120 also can indicate a present location of the communication device 110. The location can be determined, for instance, using a global positioning system (GPS) (e.g. a GPS receiver), a local positioning system, or in any other suitable manner. In one aspect of the invention, the local positioning system can include a transponder that identifies a store in which the communication device 110 is located, and such information can be included in the communication 120.

In another example, features of the image 125 can be analyzed to determine whether certain authorities should be contacted. For example, if the image features correspond to attributes which indicate an emergency, for instance a vehicle is on fire, the communication 120 can be propagated to emergency responders, such as a fire department and/or a police department. The message that is associated with the image 125 in the communication 120 can indicate a location of the present emergency. The location can be determined using a GPS receiver, a local positioning system or in any other suitable manner. In response to the communication 120, such authorities can communicate to the communication device 110 instructions for dealing with the present emergency and/or other information, such as present location and estimated time of arrival of emergency responders.

In one arrangement, the present location information can be provided as a map which includes the location of the emergency and the present location of the emergency responders. In another arrangement, a name can be associated with the location information. The name can be a name of a place, such as a store or a shopping center, or a name of a geographic region, such as a neighborhood, village, town, city, etc. Further, a link can be provided to the communication device 110 which enables the communication device 110 to receive updates pertaining to the emergency responders. The link can be, for example, a uniform resource identifier (URI) associated with a portal that provides such updates.

Figure 2:
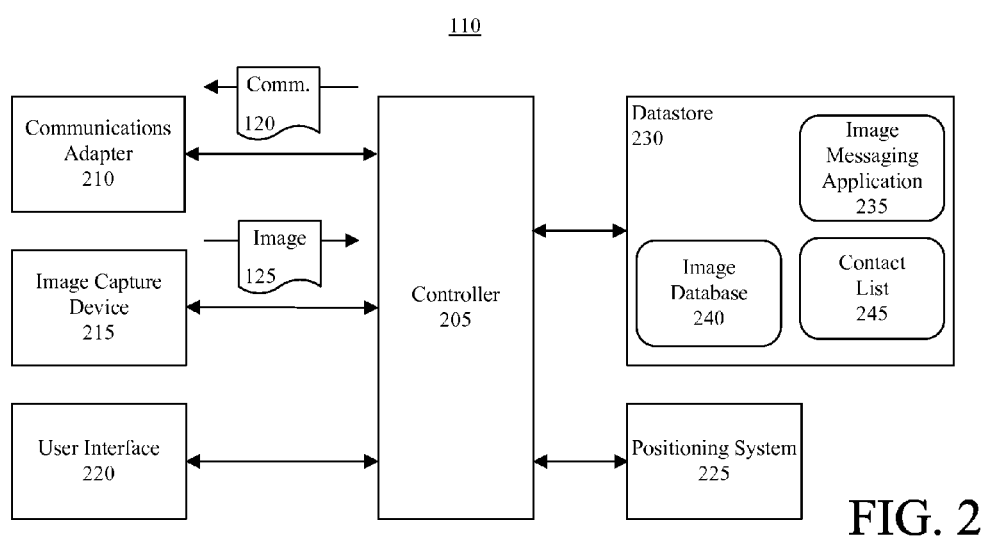
FIG. 2 depicts a block diagram of a communication device that is useful for understanding the present invention.

FIG. 2 depicts a block diagram of the communication device 110 that is useful for understanding the present invention. The communication device 110 can include a controller 205. The controller 205 can comprise, for example, a central processing unit (CPU), a digital signal processor (DSP), an application specific integrated circuit (ASIC), a programmable logic device (PLD), a plurality of discrete components that cooperate to process data, and/or any other suitable processing device.

The communication device 110 also can include a communications adapter 210. The communications adapter 210 can be any network adapter suitable for communicating via the communications network. For example, the network adapter can include a transceiver that communicates data via wireless communications and/or a communications port or network adapter that communicates via wired communications.

The communication device 110 also can include an image capture device 215. The image capture device 215 can include an image sensor, such as a charge-coupled device (CCD), a complementary metal oxide semiconductor (CMOS) image sensor, or any other image sensor suitable for detecting images. The image capture device 215 also can include an image processor that processes the images detected by the image sensor and generates image data. Image capture devices are well known to those skilled in the art.

A user interface 220 also may be provided with the communication device 110. The user interface 220 can include a keypad, a display, buttons, sensors, input and output audio transducers, and/or any other devices which may receive user inputs or present information to a user.

The communication device 110 further can include a positioning system 225. The positioning system 225 can include a GPS receiver, a receiver that detects local positioning signals, a receiver that detects a local transponder, and/or any other suitable position identification system or device.

Further, the communication device 110 can include a datastore 230. The datastore 230 can include one or more storage devices, each of which can include a magnetic storage medium, an electronic storage medium, an optical storage medium, a magneto-optical storage medium, and/or any other storage medium suitable for storing digital information. In one arrangement, the datastore 230 can be integrated into the controller 205.

An image messaging application 235 can be contained on the datastore 230. The image messaging application 235 can be executed by the controller 205 to implement the methods and processes described herein. An image database 240 also can be stored on the datastore 230. The image database 240 can associate each of a plurality of image features with unique attributes. Further, the image database 240 also can associate messages with the unique attributes. For example, the message "thinking of you" can be associated with attributes corresponding to image features of flowers. As noted, the messages also can comprise audio. For instance, a message which includes the sound of chirping birds can be associated with the attributes that correspond to the image features of flowers.

The data store 230 also can include a contact list 245. In addition to providing names of contacts, the contact list 245 can associate image attributes contained in the image database 240 with one or more of the contacts. For example, image attributes associated with a particular type of flower can be associated with a first contact, and image attributes associated with a motorcycle can be associated with a second contact. Messages also can be associated with the contacts.

At runtime, the image messaging application 235 can receive the image 125 from the image capture device 215 or the communications adapter 210. The image messaging application 235 can process the image 125 to identify one or more features of the image 125 that correlate to image attributes that are contained in the image database 240 and which are associated with contacts in the contact list 245.

To identify the features of the image, the messaging application 235 can process the image 125 using known image recognition techniques. For example, a discriminator algorithm can process the image 125 to identify objects in the image 125, and decomposition can be performed on such objects to identify different quantifiable salient attributes. The image decomposition can include radiometric correction, segmentation and/or segment group generation. For each generated segment group, additional processing steps can be performed, for instance bounding box generation, geometric normalization, wavelet decomposition, color cube decomposition, shape decomposition and/or low-resolution grayscale image generation. Such techniques are described in U.S. Patent Application Publication No. US 2002/0090132 A1 filed Nov. 5, 2001, which is herein incorporated by reference in its entirety. In the case of conflict, the present specification, including definitions, will control.

After a feature contained in the image 125 has been identified that correlates to an image attribute associated with a contact, the image messaging application 235 can initiate the communication 120 containing the image 125. The communication 120 can be forwarded by the communications adapter 210 to the contact or contacts with whom the image attribute is associated. In addition, one or more messages can be included in the communication 120. For example, a message associated with the image attribute and/or a message that has been associated with the contact can be included in the communication 120. A location of the communication device 110 can be determined by the positioning system 225 and also included in the communication 120.

Figures 3, 4:
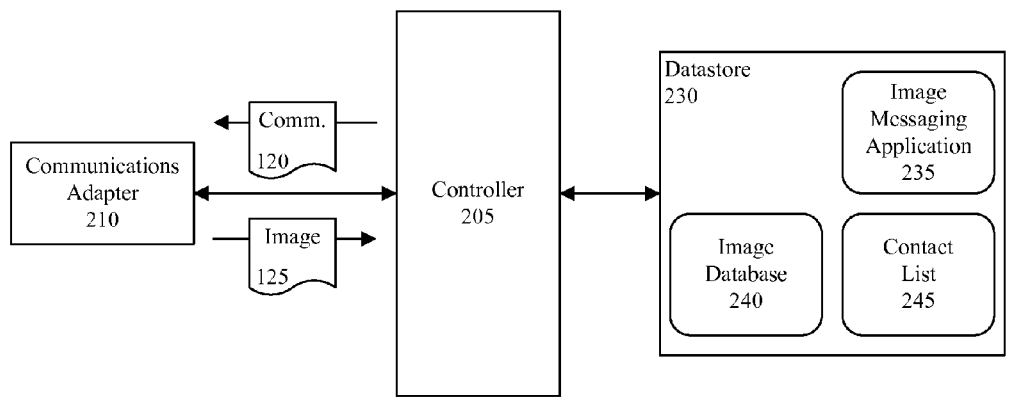
FIG. 3 depicts a block diagram of a server that is useful for understanding the present invention.
FIG. 4 depicts a contact list that is useful for understanding the present invention.

FIG. 3 depicts a block diagram of the server 135 that is useful for understanding the present invention. As noted, the image 125 can be communicated to the server 135 from the communication device and the server can process the image 125 to identify features which correspond with the image attributes. The server 135 then can generate the communication 120 which includes the image 125 and the corresponding message(s). Location information, if applicable, also can be communicated to the server 135 from the communication device. The server 135 also can include such location information in the communication 120.

In the arrangement in which the server 135 generates the communication 120, the server 135 can include the controller 205 (or processor), the communications adapter 210 and the datastore 230. Of course, the imaging messaging application 235, the image database 240 and the contact list 245 can be contained on the datastore 230, or contained on another datastore accessible to the server 135.

FIG. 4 depicts a contact list 400 that is useful for understanding the present invention. The contact list 400 can include names 405 of contacts or groups, names 410 of attributes that can be associated with the contacts or groups, and messages 415 that can be associated with the contacts or groups. The names 405 can be entered in to the contact list 400 in any suitable manner, for example, using a keyboard or keypad, buttons, or by processing a spoken utterance using voice recognition software. Similarly, the messages 415 can be entered into the contact list 400 and associated with the contacts or groups 405 in any suitable manner.

The attribute names 410 can be selected from a menu of defined attributes. The attribute names 410 can be selected, for example, using a drop-down menu or in any other suitable manner. When an attribute name 410 is selected, image attributes corresponding to the name 410 can be identified in a data table or a data file and associated with the name 405 of a contact or group. For example, if the name 410 of an image attribute that is selected for Jane is "Rose," image attributes of a rose can be associated with Jane. Similarly, if the name 410 of the image attribute that is selected for Fred is "Motorcycle," image attributes of a motorcycle can be associated with Fred, and so on.

In addition to the fields that are shown in the contact list 400, a plurality of other fields also can be included in the contact list 400. For example, the contact list can include telephone numbers, physical addresses, e-mail addresses, and/or any other desired information.

Figure 5:
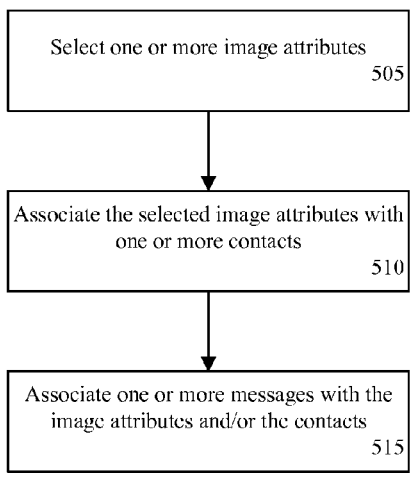
FIG. 5 is a flowchart that is useful for understanding the present invention.

FIG. 5 is a flowchart presenting a method 500 that is useful for understanding a process of associating image attributes to one or more contacts. Beginning at step 505, one or more image attributes can be selected. For example, a list of known image attributes can be presented on a communication device, and a user can select from the known image attributes. Such image attributes can be retrieved from a suitable database and/or data file in which they are stored. The database and/or data file can be contained on the communication device, or on a server to which the communication device is communicatively linked.

Proceeding to step 510, the selected image attributes can be associated with one or more contacts. For instance, the selected image attributes can be associated with a single contact or a plurality of contacts identified in a contact group.

In such an arrangement, associating the image attributes with the contact group can effectuate association of the image attributes with each of the members of the contact group. Contact information for individual members can be individually edited to un-associate or re-associate such contacts with the image attributes.

Continuing to step 515, one or more messages can be associated with the selected image attributes and/or the contacts. For example, the message "thinking of you" can be associated with an image attribute corresponding to features of a flower and to a particular contact. Alternatively, the message can be associated either with the image attributes or with the contact.

Figure 6:
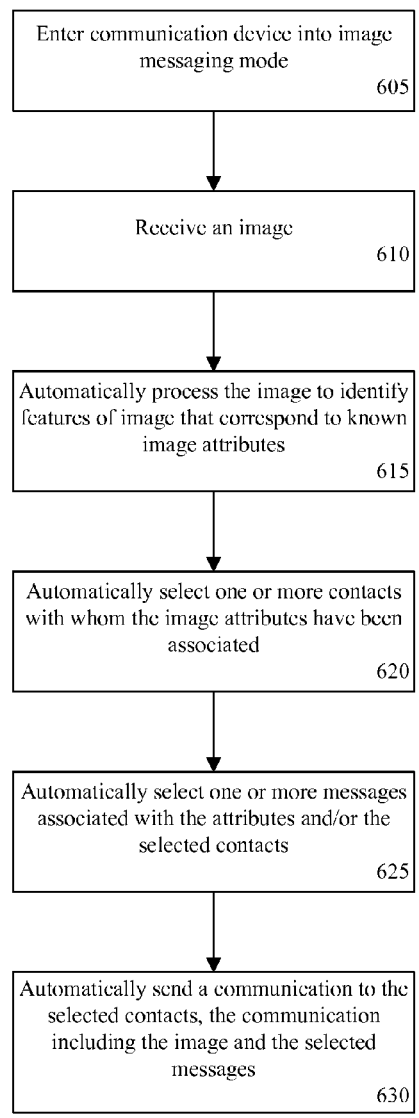
FIG. 6 is another flowchart that is useful for understanding the present invention.

FIG. 6 is a flowchart presenting a method 600 that is useful for understanding a process of sending a communication, which includes a captured image and an associated message, to one or more contacts. At step 605, a communication device can enter into an image messaging mode. For example, a user can select the image messaging mode from a menu of available device operation modes. At step 610, an image can be received by the communication device. The image can be captured by an image capture device operatively connected to, or incorporated in, the communication device. Alternatively, the image can be received via a communications adapter. For instance, the image can be downloaded from a web site or received from another communication device.

Proceeding to step 615, the image can be automatically processed to identify features of the image that correspond to known image attributes. As noted, such processing is known to the skilled artisan. Continuing to step 620, one or more contacts with whom the image attributes have been associated can be selected. In addition, at step 625, one or more messages associated with the image attributes and/or the selected contacts can be selected. As noted, such messages can comprise text, audio, still images and/or video. At step 630, a communication that includes the image and the selected message(s) can be automatically sent to the selected contact(s). In an arrangement in which location information for the communication device is available, such location information also can be included in the communication.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with an application that, when being loaded and executed, controls the processing system such that it carries out the methods described herein. The present invention also can be embedded in an application product, which comprises all the features enabling the implementation of the methods described herein, and which when loaded in a processing system is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a subroutine, a function, a procedure, an object method, an object implementation, an executable application, an applet, a servlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language).

This invention can be embodied in other forms without departing from the spirit or essential attributes thereof. Accordingly, reference should be made to the following claims, rather than to the foregoing specification, as indicating the scope of the invention.

We claim:

1. A server, comprising:
   a communications adapter; and
   a controller that:
      receives a first user input via a user interface to associate at least one image attribute with a contact;
      responsive to receiving an image from an electronic apparatus, automatically processes the image to identify at least one feature of the image that corresponds to the image attribute, and associates the image with the contact based on the image attribute; and communicates the image to the contact via the communications adapter; and
   a datastore, suitable for storing digital information, and communicatively coupled to the controller.

2. The server claimed in claim 1, wherein the datastore comprises an image messaging application.

3. The server claimed in claim 2, wherein the image messaging application comprises audio messages.

4. The server claimed in claim 2, wherein the image messaging application comprises text messages.

5. The server claimed in claim 2, wherein the image messaging application comprises image decomposition processing.

6. The server claimed in claim 1, wherein the electronic apparatus is linked to a communication network.

7. The server claimed in claim 6, wherein the electronic apparatus is capable of sending a communication containing an image via the communication network.

* * * * *